United States Patent [19]

Altomare et al.

[11] Patent Number: 4,526,794

[45] Date of Patent: Jul. 2, 1985

[54] CITRUS ALBEDO BULKING AGENT AND PROCESS THEREFOR

[75] Inventors: Robert E. Altomare, Yonkers; Robert J. Beale, New Rochelle; Martin Glicksman, Valley Cottage; Elizabeth Hegedus, Tarrytown, all of N.Y.; Marvin Schulman, Howell; Jerry E. Silverman, Hamilton Square, both of N.J.

[73] Assignee: General Foods Corporation, White Plains, N.Y.

[21] Appl. No.: 355,408

[22] Filed: Mar. 8, 1982

[51] Int. Cl.³ .................. A23L 1/277; A23L 1/34; A23L 1/04

[52] U.S. Cl. .................. 426/258; 426/259; 426/269; 426/616; 426/640; 426/804; 426/426; 426/429; 426/431; 426/481; 426/658

[58] Field of Search .............. 426/258, 259, 269, 616, 426/640, 804, 426, 429, 431, 481, 658

[56] References Cited

U.S. PATENT DOCUMENTS

| | | | |
|---|---|---|---|
| 2,452,750 | 9/1941 | Halliday et al. | 99/132 |
| 3,083,104 | 3/1963 | Celmer | 426/431 |
| 3,239,359 | 3/1966 | Stansbary et al. | 99/83 |
| 3,851,087 | 11/1974 | Nowlin | 426/431 |
| 4,205,093 | 5/1980 | Blake | 426/333 |
| 4,225,628 | 9/1980 | Lynn | 426/549 |
| 4,241,093 | 12/1980 | Farag | 426/258 |
| 4,267,196 | 5/1981 | Johnston | 426/640 |
| 4,304,768 | 12/1981 | Staub | 426/558 |
| 4,335,143 | 6/1982 | Wiener | 426/616 |

OTHER PUBLICATIONS

"Carbohydrate Fiber from Orange Albedo", *Journal of Food Science*, vol. 46 (1981), pp. 650-654.

"Natural Bulking Agents Provide Fiber and Desired Textures", *Food Processing*, May, 1981.

*Primary Examiner*—Jeanette M. Hunter
*Attorney, Agent, or Firm*—Thomas A. Marcoux; Richard D. Schmidt; Daniel J. Donovan

[57] ABSTRACT

The invention relates to a process for producing a non-caloric citrus albedo bulking agent comprising obtaining albedo from citrus peels to produce albedo particles substantially free of flavedo, water-washing to reduce soluble carbohydrates, constituents, removing alcohol and water, and bitter constituents, removing alcohol and water, and finally milling to the consistency of flour. The citrus albedo bulking agent obtained from this process is especially useful as a partial replacement for high-caloric ingredients such as flour, fat and/or sugar in a food product with at least a one-third reduction in caloric density, more preferably from 50% to 75% or higher. The citrus albedo bulking agent has a water binding capacity of from 10 to 20 grams of water per one gram of the albedo bulking agent.

19 Claims, No Drawings

1

CITRUS ALBEDO BULKING AGENT AND PROCESS THEREFOR

TECHNICAL FIELD

This invention relates to a process for producing a citrus albedo bulking agent which can be used to partially replace high-caloric ingredients, such as flour, fat and/or sugar, to prepare a food product with at least a one-third reduction in calories, more preferably from 50% to 75% or higher. Also, the albedo bulking agent is useful as a source of fiber to be incorporated into a food product.

BACKGROUND ART

There is increasing interest in foodstuffs having a reduced caloric content, and especially in low-calorie, baked goods. Such baked goods are desirable for reducing body weight in persons who are obese, without using appetite suppressants, and also for preventing unwanted weight gain in normal persons. One approach to reducing the caloric value of baked goods has been to replace part of the flour or other carbohydrate components (e.g., sugar or starch) with agents which are substantially non-digestible, and hence low in calories. For example, various forms of purified plant cellulose, such as alpha-cellulose sold under the tradename "Solka-Floc," and microcrystalline cellulose sold under the tradename "Avicel," have been proposed as partial flour substitutes.

When these conventional cellulose materials are used as a bulking agent in a food recipe, the final food product is not smooth, has a fibrous mouthfeel when chewed, gives the impression of the presence of an additional insoluble or residual substance, and tends to accumulate in the mouth. Soluble cellulose derivatives have also been used as bulking agents but tend to form unpalatable, gummy masses in the mouth. It is generally agreed, however, that calorie reduction of as high as 33% to 75% in baked goods is extremely desirable, and heretofore it has not been possible to achieve these calorie reduction levels by the use of cellulosic flour replacement alone to produce a high quality product.

U.S. Pat. No. 2,452,750, granted to Halliday et al, teaches treating pectinaceous cellulose material (citrus wastes) with acid, thereby solubilizing a major portion of the pectinaceous component, adjusting the moisture content, adding a lubricating material and, finally, shearing and flaking the material to form very thin flakes wherein the cellulosic fibers have been disrupted and made readily hydratable. The Halliday process yields a supplemental food product which is claimed to have medicinal and therapeutic value.

U.S. Pat. No. 3,239,359, granted to Stansbary et al, teaches a process for producing an albedo-based food product, specifically a cereal which comprises treating albedo with water or a salt solution (calcium chloride or sodium chloride) to form a paste which is boiled to remove bitter constituents (while optimally at the same time minimizing the removal of pectin and sugars), extracting the liquids, treating with a soluble salt to increase viscosity and then spreading out the albedo paste and baking said paste to produce a dry, crisp product.

While the prior art discloses a highly-nutritious food product derived from albedo, there is a need for the production of a low-calorie bulking agent which is substantially flavorless and colorless and which could be used as a partial replacement for high-caloric constituents.

DISCLOSURE OF THE INVENTION

The present invention discloses a process for producing an albedo bulking agent which is bland, decolorized and non-caloric and which can be incorporated into food products at levels of from 0.1 to 60% as a partial replacement for high-caloric ingredients, such as flour, fat and/or sugar. The product of this invention is especially useful in formulating a food product with at least a one-third reduction in calories, more preferably from 50–75% or more. The caloric reduction results from either the high water binding capacity of the albedo bulking agent or from dilution of high caloric ingredients in foodstuffs or a combination of the two. The product of the present invention is also a good source of fiber which may be incorporated into a foodstuff, particularly a cereal product.

The citrus albedo bulking agent produced according to the present invention is usually only a partial replacement for high-caloric constituents such as flour. So, for example, if a significant quantity of flour is to be replaced, a combination of albedo bulking agent, wheat gluten and egg white solids can be substituted.

The source material for the new product of this invention is the peel or rind of citrus fruit, e.g., orange, lemon, lime, grapefruit, etc. Citrus albedo is a waste by-product of the citrus industry and, as such, it is available in large quantities. As is known, the peel or rind of citrus fruit is divided into two portions: one called the flavedo, which is the outside colored portion of the rind and is that portion in which the oil cells and pigments are situated; the other called the albedo, which is the inner light-colored, pith-like portion. A minor amount of albedo material is located in the outer portion of the peel. There is not however, a clear line of demarcation between the flavedo and albedo. The albedo is an extremely rich source of pectinaceous material wherein it occurs in association with natural amorphous cellulose and hemicelluloses. Native, unprocessed citrus albedo typically contains on the order of 35% pectinaceous substances and 15% cellulose by weight, dry basis.

The process involves shaving off flavedo from citrus peel to obtain albedo particles which are substantially free of flavedo, water-washing the albedo particles to remove substantially all of the soluble carbohydrates, contacting the water-washed albedo particles with an alcoholic solution to deflavorize and decolorize the albedo and removing alcohol and water from the albedo particles. Preferably the treated albedo particles are then ground to the preferred particle size in order to achieve the desired functionality.

In a modification of the process, calcium compound treatment can be utilized. In this modification, a calcium compound, preferably calcium oxide, is added into the water used in the water-washing step. The calcium oxide is added at a level of from 0.1% to 1.0% based upon the weight of albedo, wet basis. The action of the calcium on the albedo permits the utilization of less alcohol during the subsequent debittering and deflavoring step resulting in a considerable cost savings. Despite the decreased utilization of alcohol, the final bulking agent is free from detectable bitterness, color and off-flavors. Other calcium salts such as calcium chloride and tricalcium phosphate can be utilized in this treatment.

After the flavedo is shaved from the peel, the albedo must be handled carefully to prevent autolysis and/or fermentation from occurring. To prevent these unwanted reactions, either the albedo must be rapidly processed or it must be frozen or preserved by methods known to those skilled in the art such as by sulfur dioxide treatment. Freezing will temporarily halt the breakdown process but it will not prevent autolysis or fermentation upon thawing. A preferred operating procedure where the flavedo shaved peels must be shipped to a separate albedo-processing plant would be to preserve the intact bulk albedo which is obtained after the citrus peels are shaved to remove flavedo, and then the bulk albedo is ground preferably to a particle size of 0.06 inch. For reasons which are not completely understood, it is better operating procedure to grind the albedo after thawing if freezing is to be utilized.

Although the shaving of the citrus peel serves to isolate the albedo component from the unwanted flavedo, a separation technique, such as flotation, or air classification may be utilized to rid the albedo of any residual flavedo. When a Brown Shaver (Automatic Machinery Corp.) is used to remove flavedo, successful flavedo removal will vary from a low of approximately 50% to a high of approximately 85%.

It is conceivable that one could utilize the whole peel of the citrus albedo as the starting material for this new, inventive process. However, this would necessitate additional and/or more prolonged debittering and decolorizing treatment since the flavedo layer of the citrus peel is much more difficult to purify due to the high carotenoid content.

The albedo may be coarsely ground to reduce the particle size, after flavedo is removed, in order to facilitate the extraction process. The rate of extraction is inversely related to the particle size thickness. The albedo may be ground in a Comitrol 3600 with a 0.06 inch plate. The 0.06 inch size allows a reasonably rapid rate of extraction without producing excessive fines. The fines have a tendency to compact or to be entrained during alcohol extraction.

After the flavedo has been removed, the albedo is water-washed to remove a majority of the soluble carbohydrates. Preferably greater than 75% of the soluble carbohydrates are removed during the water washing, most preferably greater than 95%. The completely processed, dried albedo bulking agent produced in accordance with this invention will contain less than 1% soluble carbohydrates. The majority of soluble carbohydrates are removed during the water-washing step, however some carbohydrates are removed during the alcoholic extraction of color and bitter constituents.

To maximize the removal of soluble carbohydrates, two or more water-washes are preferable. After water-washing it is preferable to dewater the water-washed albedo particles in order to facilitate alcoholic removal of color and bitter constituents. Dewatering procedures include screw pressing, centrifugation, sieving, and alcoholic dehydration. These procedures are well known to those skilled in the art.

Suitable alcoholic solutions to accomplish the removal of bitter constituents and colors from the albedo include methanol, ethanol or isopropanol (IPA) alone or in combination with water. Other solvents which have been shown to remove bitter constituents and color include tertiary butyl alcohol, ethylene glycol mono methyl ether, 2-methyl ethyl ether and hexane. However these solvents are not as preferred as the aforementioned alcoholic solutions.

The preferable alcoholic solution is an isopropanol concentration greater than 70 weight percent. 100% IPA can be used successfully yielding a dried product that has an extremely low bulk density in the order of 0.18 g/cc. The preferred concentration of IPA is 70–80 weight percent if the albedo is to be vacuum dried to low IPA residual levels in a single stage. It is difficult to vacuum dry 87% or greater IPA treated albedo in a single step. In order to maximize color removal from the albedo, countercurrent extraction is recommended because the most extracted albedo comes in contact with the freshest solvent. Since the albedo is very porous, it is desirable to minimize the chances of the albedo retaining color-laden alcohol within its structure. Other processes to accomplish the alcoholic removal of color include batch extraction and single column leaching. These procedures are well known to the skilled artisan.

The removal of alcohol poses a difficult problem. There are different methods to maximize the removal of alcohol after color removal has been accomplished. The first alternative involves the utilization of a IPA/water solution of 78% or less followed by vacuum drying. While this concentration will assure maximum alcohol removal from the albedo particles, this low concentration does not produce the most optimal color removal. Another alternative involves utilizing a higher IPA/water concentration and a two phased approach of first removing alcohol and then drying the particles. Moisture is necessary in the albedo particle to allow for the escape of alcohol from the particle. If the albedo particle is allowed to dry without first removing the alcohol, alcohol will be fixed within the structure and it will be extremely difficult to remove from the dry material. When the albedo surface dries out and case hardens, any IPA present in the albedo particle will be entrapped. Since most alcohol should be removed before water is driven off, water can be sprayed on the albedo particles to keep the albedo particles moist. A rewet/redry process can be utilized as well as fluid bed drying wherein water is sprayed on the albedo particles to keep the surface porous so alcohol will not be fixed within the albedo particle. While the above specified methods are preferred, the albedo particles could be spread out on trays and allowed to air-dry.

After the albedo particles have been dried, they are preferably milled so as to produce the consistency of a flour, having an average particle size typically less than 100 microns, preferably less than 50 microns. This final reduction in particle size is critical to the functionality of the albedo bulking agent and its successful incorporation into a food product, especially if it is to be baked.

The citrus albedo bulking agent produced in accordance with the present invention is bland and decolorized. The exact preferable particle size will depend largely upon which food application the albedo bulking agent will be put to.

The albedo bulking agent will absorb moisture and will provide bulk for foods which it is incorporated into. The albedo bulking agent has a water binding capacity of from 10 to 20 grams of water per 1 gram of the albedo bulking agent. The water binding capacity of the citrus albedo bulking agent was determined analytically as being the weight of water retained in a pellet formed by centrifuging a slurry of citrus albedo bulking agent in excess water.

The citrus albedo bulking agent is a non-caloric ingredient. The term non-caloric means that citrus albedo bulking agent has 0 calories per gram. The caloric availability was measured by a bioassay technique relating animal growth to calories supplied. Specifically this was done by comparing the growth of animals eating a basal diet plus the citrus albedo bulking agent to the growth of animals eating the basal diet plus an appropriate standard, in this case sucrose. (For further information on this bioassary technique see Staub, H. W., Caloric Availability of Dietary Polyols, Fed. Proc., 37, 678. 1978; and Staub, H. W. and Ali, R. Chapter 4 Nutritional and Physiological Value of Gums in Food Hydrocolloids edited by Glicksman, M. CRC Press, Boca Raton, Fla., 1982.)

The citrus albedo bulking agent contains less than 1% soluble carbohydrates, preferably less than 0.5%, less than 1000 ppm residual alcohol, preferably less than 250 ppm, most preferably zero. Greater than 90% of the citrus coloration (determined by colorimetric assay) has been removed from the albedo bulking agent particles, preferably greater than 95%. The albedo bulking agent contains within the range of from 30–65% total pectin, typically 40–50%. This citrus albedo bulking agent contains within the range of from 25% to 35% cellulose, from 1% to 7% hemicellulose and from 0.5% to 1.5% lignin. It contains within the range range of from 20–40% Neutral Detergent Residue (NDR) or dietary fiber, typically 25–35%; within the range of from 20–35% crude fiber, typically 25–30%; within the range of from 1.5 to 6% ash, typically 1.5–3%; within the range of from 3 to 7% protein, typically 3.5 to 5%; a moisture content less than 15%, typically less than 10% and within the range of from 0.11 to 0.68 bulk density (g./cc.).

The NDR or cell wall material in the detergent system of fiber analysis represents dietary fiber, consisting of the hemicelluloses, celluloses and lignin with perhaps some fiber bound protein. Other broader definitions of dietary fiber include unavailable storage polysaccharides, pectinaceous substances, gum, mucilages and modified polysaccharides. Certain other substances intimately associated with the plant cell wall such as small amounts of nonlignin phenols, cutin, phytic acid and some minerals are included in some definitions of dietary fiber. The polysaccharides associated with dietary fiber are not digested by mamallian digestive enzymes but are partially fermented in man by the colonic microflora.

Those skilled in the art will appreciate that the term dietary fiber is an indefinite one which has several meanings depending upon the method of assay among other variables. To remove this uncertainty the definition of NDR in this application will be as defined by the method of Goering and Van Soest (Arg. Handbook No. 379, A.R.S. USDA Washington, D.C., 1970) as modified and discussed by Robertson (Chapter 1. The detergent system of fiber analysis in *Topics in Dietary Fiber Research* edited by G. A. Spiller and R. J. Amen, Plenum Press N.Y. 1978).

Crude fiber is loss on ignition of dried residue remaining after digestion of sample with 1.25% sulfuric acid and 1.25% sodium hydroxide under specific conditions. Typical conditions and methodology are described in the Officials Methods of Analysis of the Association of Official Analytical Chemists.

The invention is illustrated, but not limited, by the following specific examples of the method of preparation of the albedo bulking agent and its incorporation into various food products. It will be recognized that various additional modifications can be made without deviating from the scope of the invention.

EXAMPLE 1

The starting material was Florida Valencia citrus peels which were shaved with a Brown Peel Shaver to separate the citrus albedo from flavedo. The albedo was frozen and stored at −10° F. (−23° C.) until processing. The albedo in a semi-frozen state was ground using an Urschel Commitrol using a 2-B-010060 cutting head to reduce the albedo particle size to less than 1/16 inch. A 9:1 water to albedo ratio was used during water-washing to remove approximately 90% of the sugar. After water-washing the albedo was subjected to one half hour batch centrifuge. The washed albedo was column extracted with 85.9 weight percent isopropyl alcohol which resulted in producing excellent color and flavor removal and a white appearing product. The albedo was dried by using an Aeromatic, Inc. brand Fluid-bed dryer (batch type). The fluid bed dryer was loaded with 200 lbs. of extracted albedo and 20 pounds of water sprayed on the aerated bed. Drying conditions were 2 hours at 110° F. (43° C.) and 1 hour at 140° F. (60° C.). An analysis of isopropyl alcohol levels showed an average of 243 ppm. residual and a moisture content of 2.1%. Grinding of the dried albedo particles was accomplished by using an Alpine mill by passing the albedo particles through twice. After the second pass the average particle size of the albedo bulking agent was 100 microns.

EXAMPLE 2

This embodiment involves an albedo extraction process utilizing a calcium compound treatment which is included in order to permit decreased utilization of isopropyl alcohol thereby resulting in a considerable cost savings. Citrus peels were shaved with a Brown Peel Shaver in order to obtain albedo particles substantially free of flavedo. The albedo was then ground through a 0.06 inch plate of a Urschel Commitrol Grinder. The ground material was water-washed in two stages each utilizing a 4:1 ratio of water to albedo at 70° F. (21° C.) for 20 minutes. Then 11.35 grams of calcium oxide (0.15% based on the washed and drained weight of the albedo) was added to the second wash stage. The washed albedo was centrifuged to a solids content of 18%. It was then soaked in pure isopropyl alcohol (approximately 1.5 times its weight) for two hours. The soaked albedo was drained and column extracted with 80% (volume %) isopropyl alcohol at 124° F. (51° C.). Approximately 17 kg. of 80% isopropyl alcohol was used to extract 99% of the color from the albedo. The extracted albedo was then dried in the Stokes vacuum oven for 24 hours under 25 Hg. vacuum at 70° F. (21° C.). The dried albedo bulking agent particles were then milled to a flour consistency.

EXAMPLE 3

This embodiment discloses an albedo extraction process without the incorporation of calcium compound treatment. A Brown Peel Shaver is employed to separate the citrus albedo from flavedo. Then the process calls for a two-stage particle reduction. The albedo is first reduced in size by the use of a grinder with a one-half inch plate. Thereafter, the albedo is again reduced in size by using a Urschel Commitrol to a particle size of 0.06 inches. The albedo is then water-washed to removed solubles. A ratio of 4:1 water to albedo was used with the water temperature within the range of from 50°–90° F. (approximately 10° C. to 32° C.). The washed albedo particles are mechanically dewatered by means of centrifugation. The albedo is then mixed with a 90% (volume %) isopropyl solution at a ratio of from 1.5 to 1:1 of 90% isopropyl alcohol to albedo. The albedo is then isolated by means of a solids-liquid separator. The albedo is then subjected to continuous countercurrent extraction using 90% isopropyl alcohol at a ratio of from 4:1 to 6:1 isopropyl alcohol to albedo, for 1.5 to 2 hours at a temperature of 120°–140° F. (approximately 49° C. to 60° C.). The extracted albedo is then vacuum dried at 26″ Hg. vacuum at 140°–150° F. (approximately 60° C. to 66° C.). In order to achieve IPA levels under 500 ppm. it was necessary to rewet and redry the vacuum-oven dried albedo bulking agent particles. The dried albedo is then milled or ground to an average particle size of 100 microns.

EXAMPLE 4

The following formulation was used to make a 50% calorie-reduced cake utilizing orange albedo bulking agent produced according to Example 1.

| Ingredient | Amount (gms.) |
| --- | --- |
| Water | 310 |
| Cake Flour | 100 |
| Sugar | 90 |
| Shortening | 20 |
| Orange Albedo Bulking Agent | 20 |
| Egg White Solids | 13 |
| Baking Soda | 6 |
| Sodium Aluminum Phosphate (Levair-Stauffer Chemical Co.) | 6 |
| Instant Non-Fat Milk Solids | 5 |
| Sodium Stearyl-2-Lactylate (Emplex-Patco) | 4 |
| Salt | 1 |
| Polyoxyethylene (20) sorbitan mono-oleate (Tween 80-ICI Americas, Inc.) | 1 |
| Vanillin | 0.1 |
| | 576.1 |

The sugar and shortening were creamed together in a Mixmaster bowl. All of the dry ingredients (with the exception of Tween 80) were premixed and sifted twice. The creamed sugar and shortening were added to the dry mix and blended well. The Tween 80 was dispersed in the water and then added to the dry blend and cream sugar and shortening and was then mixed at high speed for 3 minutes in the Mixmaster. 500 grams of the resulting batter was poured into an 8 inch round cake pan and baked at 350° F. (177° C.) for 40 minutes. The finished cake had a caloric value of 1.9 calories per gram as compared to conventional white cake with 3.75 calories per gram (USDA Handbook #8). The water content of the finished cake as consumed was 48.7%. The resulting cake had a good height, structure, texture and appearance and was of excellent overall quality.

We claim:

1. A process for producing a citrus albedo bulking agent which comprises:
    (a) shaving a citrus peel to obtain albedo particles which are substantially free of flavedo;
    (b) washing the albedo particles with water prior to autolysis and/or fermentation occurring therein to remove at least 75% of soluble carbohydrates;
    (c) contacting the water-washed albedo particles with an alcoholic solution to deflavorize and decolorize the albedo and remove additional carbohydrates;
    (d) removing the water and alcohol from said albedo particles to produce a bland, decolorized citrus albedo bulking agent; and
    (e) comminuting the dried citrus albedo bulking agent.

2. A process according to claim 1 which further comprises removing water from the water-washed albedo particles by a dewatering procedure prior to the contacting with the alcoholic solution.

3. A process according to claim 2 wherein the dewatering procedure consists of screw pressing, centrifugation, alcoholic dehydration or sieving.

4. A process according to claim 1 wherein the alcoholic solution is selected from the group consisting of isopropanol, methanol and ethanol.

5. A process according to claim 4 wherein the alcoholic solution is isopropanol.

6. A process according to claim 5 wherein the isopropanol is of a concentration of greater than 70 weight percent.

7. A process according to claim 1 wherein the contacting of the water-washed albedo particles with the alcoholic solution is accomplished by continuous countercurrent extraction, batch extraction or single column leaching.

8. A process according to claim 1 wherein the removal of alcohol and water is accomplished by vacuum drying, fluid bed drying or air tray drying.

9. A process according to claim 1 which further comprises the addition of a calcium compound into the water-washing step.

10. The process according to claim 9 wherein the calcium compound is calcium oxide.

11. The process according to claim 10 wherein the calcium oxide is added at a level of from 0.1% to 1% based upon the weight of albedo, wet basis.

12. A process according to claim 1 wherein the shaved albedo is rapidly further processed after shaving by freezing or treating with sulfur dioxide prior to autolysis or fermentation.

13. The process according to claim 1 wherein the finely comminuted citrus albedo bulking agent is of an average particle size of 100 microns or less.

14. A process according to claim 1 wherein the finely comminuted citrus albedo bulking agent is of an average particle size of 50 microns or less.

15. A process according to claim 1 wherein the citrus peel is selected from the group consisting of orange, lemon, lime and grapefruit.

16. A process according to claim 1 where the citrus albedo is orange albedo.

17. The process according to claim 1 wherein said citrus albedo bulking agent is non-caloric.

18. The product produced by the process of claims 1, 5, 9, 11, 12, 16 or 17.

19. The product of claim 18 which has a water binding capacity of from 10 to 20 grams of water per one gram of said citrus albedo bulking agent.

* * * * *